A. O. CURRY.
CRANK HANDLE.
APPLICATION FILED DEC. 27, 1913.
1,146,054.
Patented July 13, 1915.
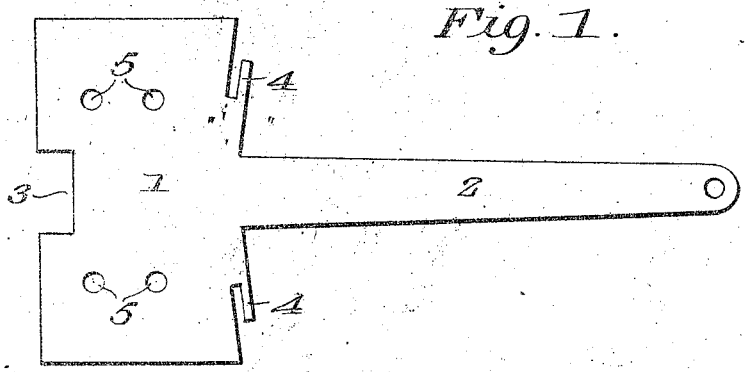
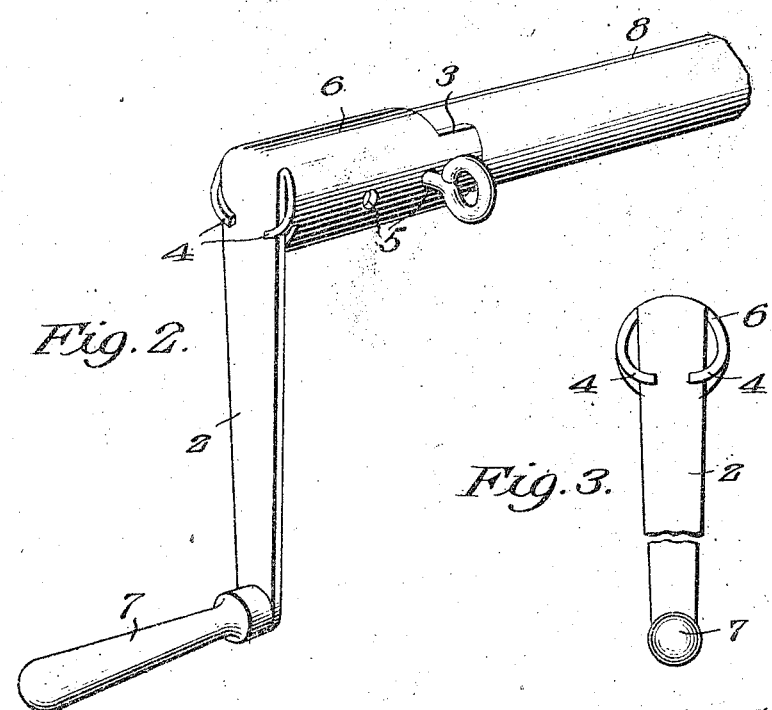
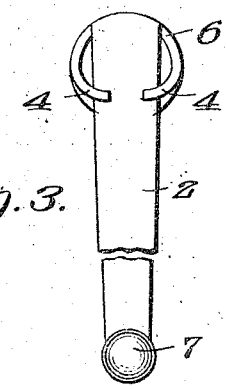
Witnesses
Hugh H. Ott
D. W. Gould
Inventor
A. O. Curry
By Victor J. Evans
Attorney

UNITED STATES PATENT OFFICE.

ARTHUR O. CURRY, OF SAN BERNARDINO, CALIFORNIA.

CRANK-HANDLE.

1,146,054.  Specification of Letters Patent.  Patented July 13, 1915.

Application filed December 27, 1913. Serial No. 809,054.

*To all whom it may concern:*

Be it known that I, ARTHUR O. CURRY, a citizen of the United States, residing at San Bernardino, in the county of San Bernardino and State of California, have invented new and useful Improvements in Crank-Handles, of which the following is a specification.

The invention relates to an implement designed primarily for removable connection with the cutter shaft of a lawn mower to permit convenient operation of said shaft for sharpening the mower.

The main object of the present invention is the provision of a handle implement constructed from a single blank and adapted for convenient connection to or disconnection from the blade shaft of the lawn mower to permit convenient reverse operation of the latter necessary in the sharpening process.

The invention in the preferred form of details will be described in the following specification, reference being had particularly to the accompanying drawings, in which:—

Figure 1 is a plan illustrating the blank from which the improved handle is constructed. Fig. 2 is a perspective view of the handle in completed form. Fig. 3 is a plan view of the same.

Referring particularly to the accompanying drawings, the improved implement is constructed from a single blank to provide an approximately rectangular plate 1 from one edge of which projects a comparatively narrow handle portion 2. The handle portion 2 extends centrally from one of the longer edges of the plate portion 1, and the latter on the edge opposite the handle connection is centrally formed with a recess 3. The edges of the plate from the connection of the handle therewith extend outwardly at an upward inclination toward the free end of the handle, and each of these edges is formed to provide a lip 4. The plate approximately in line with the respective lips is formed with a transversely alined opening 5. In completing the article the plate is bent in cylindrical form and the handle portion bent at right angles to the cylinder 6, thus formed so that the handle portion rests upon the inclined portions of the plate. The lips 4 are bent to overlie the handle portion, securing the latter in a plane transverse the end of the cylindrical portion 6, as shown in Fig. 2. In this position, the openings 5 register diametrically of the cylindrical portion, as shown. A hand gripping rod 7 is secured in the free end of the handle portion in any appropriate way.

In use, the wheel of the lawn mower is removed through the use of the notch 3 in an obvious manner, and after removing the adjacent cog wheel from the blade shaft 8, the handle or crank is applied, and the cotter pin passed through one set of openings 5 and the hole in the blade shaft. Oil and emery is then applied to the bottom plate or fixed blade, and the blade shaft revolved in the direction reverse to that incident to the cutting operation.

The improved implement is of simple type, is constructed from a single piece of metal, and forms a convenient and readily adaptable device for the purpose named.

What is claimed is:—

A handle member including a cylindrical section, a handle strip integral with said section and disposed at right angles thereto, and tongues integral with the cylindrical section and overlying and bearing upon the handle member.

In testimony whereof I affix my signature in presence of two witnesses.

ARTHUR O. CURRY.

Witnesses:
JED VAN LUVEN,
JOE ZIMMERMAN.